US010379381B2

(12) United States Patent
Gerligand et al.

(10) Patent No.: US 10,379,381 B2
(45) Date of Patent: Aug. 13, 2019

(54) CONTACT LENS WITH OPTIMIZED PERFORMANCE AND METHOD OF DESIGN

(71) Applicant: Johnson & Johnson Vision Care, Inc., Jacksonville, FL (US)

(72) Inventors: Pierre-Yves Gerligand, St. Johns, FL (US); Gregory J. Hofmann, Jacksonville Beach, FL (US); Philippe Jubin, Fernandina Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 574 days.

(21) Appl. No.: 14/733,391

(22) Filed: Jun. 8, 2015

(65) Prior Publication Data

US 2016/0357030 A1    Dec. 8, 2016

(51) Int. Cl.
*G02C 7/04* (2006.01)
*G02C 7/02* (2006.01)

(52) U.S. Cl.
CPC ............ *G02C 7/048* (2013.01); *G02C 7/021* (2013.01); *G02C 7/027* (2013.01); *G02C 7/028* (2013.01); *G02C 7/047* (2013.01); *G02C 7/049* (2013.01)

(58) Field of Classification Search
CPC ........ G02C 7/028; G02C 7/021; G02C 7/022; G02C 7/024; G02C 7/025; G02C 7/04; G02C 7/047; G02C 7/048; G02C 7/06; G02C 2202/24; G02C 7/027; G02C 7/049; A61F 2/1602
USPC .............. 351/159.41, 159.74, 159.02, 159.1, 351/159.01, 159.07, 159.14, 159.46, 351/159.73, 159.78, 247, 159.77, 246
See application file for complete search history.

(56) References Cited

U.S. PATENT DOCUMENTS

| | | | |
|---|---|---|---|
| 2008/0074611 A1* | 3/2008 | Meyers | G02C 7/04 351/159.02 |
| 2009/0141235 A1 | 6/2009 | Collins et al. | |
| 2011/0149229 A1* | 6/2011 | Gerligand | G02C 7/048 351/159.1 |

(Continued)

FOREIGN PATENT DOCUMENTS

| | | |
|---|---|---|
| WO | WO2004097502 A1 | 11/2004 |
| WO | WO2005022242 A1 | 3/2005 |

(Continued)

*Primary Examiner* — Evan P Dzierzynski
*Assistant Examiner* — Alberto J Betancourt
(74) *Attorney, Agent, or Firm* — Carl J. Evens (57) ABSTRACT

An optimized contact lens design and method which leverages the strain energy of the system when placed on eye that improves centration, translation, and stabilization characteristics, or any combination thereof, in order to improve both comfort and vision. A contact lens design and methodology wherein the lens-eye resulting strain energy is optimized to achieve the desired function be it centration, translation, or stabilization. Since the lens strain energy is directly driven by the amount of lens deformation, it is possible to control the lens strain energy through the modulus of the material, design of the lens geometry, namely the radii or curvature, peripheral thickness profiles, edge or rim shapes. The surface pressure and/or lens strain energy can be optimized for a given population by averaging the ocular eye shape/surface. Alternatively the lens strain energy can be optimized for a single given eye (i.e., custom design).

6 Claims, 11 Drawing Sheets

(56) References Cited

U.S. PATENT DOCUMENTS

| | | | |
|---|---|---|---|
| 2011/0149230 A1* | 6/2011 | Menezes | G02C 7/048 351/159.02 |
| 2011/0149231 A1* | 6/2011 | Gerligand | G02C 7/028 351/159.02 |
| 2012/0062836 A1 | 3/2012 | Tse et al. | |
| 2013/0077045 A1* | 3/2013 | Gerligand | G02C 7/048 351/159.74 |
| 2013/0278888 A1 | 10/2013 | Bakaraju et al. | |
| 2015/0286069 A1* | 10/2015 | Allione | G01M 11/025 351/159.75 |

FOREIGN PATENT DOCUMENTS

| | | |
|---|---|---|
| WO | WO2011084678 A1 | 7/2011 |
| WO | WO2011084684 A1 | 7/2011 |
| WO | WO2013048893 A1 | 4/2013 |

\* cited by examiner

Strain Energy (mJ)

FIG. 7A

Minimum Strain Energy @ 15° Cylinder axis

FIG. 7B

Minimum Strain Energy @ 25° Cylinder axis

FIG. 7C

Minimum Strain Energy @ 15° Cylinder axis
With radial shift

FIG. 8

CONTACT LENS WITH OPTIMIZED PERFORMANCE AND METHOD OF DESIGN

BACKGROUND OF THE INVENTION

1. Field of the Invention

The present invention relates to ophthalmic lenses, and more particularly to the design of contact lenses leveraging and tailoring the resulting strain energy of the eye-lens system when the lens is worn on eye to achieve improved centration, translation, rotation/stabilization, comfort and ultimately vision.

2. Discussion of the Related Art

Contact lenses are considered medical devices and may be worn to correct vision and/or for cosmetic or other therapeutic reasons. Contact lenses have been utilized commercially to improve vision since the 1950s. Early contact lenses were made or fabricated from hard materials, and were relatively expensive and fragile. Although these contact lenses are still utilized, they are not suitable for all patients due to their poor initial comfort. Later developments in the field gave rise to soft contact lenses, based upon hydrogels, which are extremely popular and widely utilized today. The introduction of soft contact lenses has significantly improved the comfort experienced by the wearer. While this achievement is the result of numerous developments and advancements by many in this field, a significant consideration is that soft contact lenses are significantly less rigid than their predecessors. As such, when the contact lens is placed on eye, it is more susceptible to the stresses and strains placed upon it as it deforms and conforms to the anterior surface of the eye. This interaction of the lens with the shape of the eye, in itself is a major consideration, particularly when one attempts to design a lens for a specific purpose such as vision correction, but other considerations for additional purposes are just as important and relevant.

Anatomical shapes of the eye although generally similar, do differ from patient to patient, and also tend to be asymmetric. Specifically the asymmetry of the normal eye can be described as having a larger change in curvature in the nasal region as compared to the change of curvature in the temporal region. Said another way, in looking at the curvature of the peripheral region of the eye in the transverse plane as one moves from the center of the cornea in towards the nose, the rate of change of curvature is larger as compared to moving from the center of the cornea out towards the temple, thus resulting in two different curvatures and resulting in a transverse plane asymmetry. This asymmetry also results in asymmetric forces being placed upon the contact lens when it is worn. Specifically, as the posterior surface of the contact lens interacts with the anterior surface of the eye, particularly in the peripheral region, it can result in the contact lens being displaced temporally thus impacting centration. If the lens is no longer centered, vision correction may be impacted. In the sagittal plane of the eye, it is known that the peripheral inferior portion of a patient's eye tends to be steeper than the peripheral superior portion. Attempts to leverage this sagittal asymmetry are presented in U.S. Pat. No. 6,406,145 in which the innovators take into account the natural shape of the lens wearer's eye in designing the base curve of the lens. While this is a step in the proper direction, one may realize additional improvements by considering the multi-dimensional aspects of the eye's asymmetries. This is accomplished by analyzing and assessing the contact lens and the eye as a system, particularly as it relates to the resulting strain energy and lens centration as a result of the lens geometry interacting with the eye geometry when the lens is worn. Other contributing factors include the mechanical properties of these items as well.

In treating presbyopic patients, one innovation is the use of translating lens designs. As a person ages, the crystalline lens gradually becomes more rigid, and thus their eyes are less able to accommodate. Said another way, their ability to alter the shape of the natural lens to focus on objects is diminished. This condition is known as presbyopia. The typical translating lens relies on the relative movement of the contact lens relative to the eye, specifically the pupil. Typically the translating lens will have multiple optical zones, for instance a near and far zone to account for the loss of the patients ability to accommodate, and depending on the angle of gaze, one can optimize vision by directing the gaze through one zone or the other. To accomplish this, the near and far zones are generally placed inferior and superior respectively, and as an example as one looks downward (typically for near vision needs such as reading) they are looking through the lower (near) portion of the lens. This is successful because the lens, through interaction with the lower eyelid, is typically driven upward, relative to the pupil, whose angle of gaze is being directed downward. As their gaze returns to a more horizontal position and they look to objects in the distance, the relative position of the lens is such that the pupil of the eye is now aligned with the superior (far) portion of the lens. Thus optimizing focus for both near and far vision needs.

The relative movement of the translating lens may be impacted by the asymmetry of the eye and how it interacts with the contact lens thus not allowing the desired result to be achieved. But there are other considerations as well, for example, U.S. Pat. No. 7,216,978 illustrates that the upper and lower eyelids do not move strictly in a vertical direction during blinking. Rather, the upper lid moves substantially vertically, with a small nasal component during blinking, and the lower lid moves substantially horizontally, moving nasal-ward during blinking. Additionally, the upper and lower eyelids are not symmetrical with respect to a plane cutting though the vertical meridian. In other words, individuals do not blink symmetrically relative to a horizontal axis drawn between the open upper and lower lid. Accordingly, blinking in of itself may not result in the ideal translation of the contact lens thus presenting yet another opportunity to improve upon the design. Another type of translating lens has a truncated shape. That is, unlike most lenses that are substantially continuously circular or oval, the lower portion of the truncated contact lens is flattened by cutting off or shortening that part of the lens. This results in a substantially flat, thick edge at the bottom of the lens. Exemplary descriptions of such lenses are set forth in a number of patents, including U.S. Pat. Nos. 7,543,935, 7,430,930, 7,052,132, and 4,549,794. However, a relatively flat edge on contact lenses such as these may tend to reduce comfort. An alternative approach which leverages the concept of a minimum energy position is that which is provided in U.S. Pat. No. 7,810,925, in which a lens design with two discreet stability positions is suggested to optimize lens position for near and distance vision needs. The concept of minimum potential energy position can be leveraged to achieve these two stability positions. Given that some level of displacing force (potentially a significant level in the '925 patent case) is required to move from one position to the other it's likely that some level of discomfort is also being introduced for the initial stability position to be overcome in order to move to the second stability position. Furthermore, the approach of the '925 patent is limited to two distinct positions, in contrast to applicant's invention which not only leverages a continuum of positions and thus relative strain energies rather than distinct states, but also allows for a smooth transition along this continuum.

In the astigmatic patient, in addition to centration, relative rotational orientation of the lens is important to correct one's vision. Astigmatism is caused by a non-rotationally symmetric curvature of the cornea and/or the crystalline lens in the optical zone. A normal cornea is substantially rotationally symmetric, whereas in an individual with astigmatism this is not the case. In other words, the optical zone of the eye is actually more curved or steeper in one direction than another, thereby causing an image to be stretched out into a line of focus (cylinder) rather than focused to a single point. Toric rather than spherical/single vision lenses can be used to address this. A toric lens is an optical element having two different powers in two orientations that are perpendicular to one another. Essentially, a toric lens has one power, spherical for correcting myopia or hyperopia, and one power, cylinder for correcting astigmatism built into a single lens. These powers are created with curvatures oriented at different angles which are preferably maintained relative to the eye. The proper rotational orientation of the toric lens is essential to properly correct for astigmatism. However, toric contact lenses may tend to rotate on the eye thereby temporarily providing sub-optimal vision correction. Accordingly, currently utilized toric contact lenses also include a mechanism to keep the contact lens relatively stable on the eye when the wearer blinks or looks around in order to maintain the correct vision correction. To ensure the proper orientation of the lens, various methods of lens stabilization have been utilized such as ballast or preferential thick and thin zones. While there are various ways to achieve stabilization, all ways ultimately will be affected to varying degrees, by the interaction of the posterior surface of the contact lens with that of the anterior surface of the eye, particularly in the peripheral regions, which may also negatively impact vision and or subjective comfort. The challenge with currently designed or utilized stabilization zones is a tradeoff between contact lens stability and comfort, plus the physical limitations associated with increased thickness. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. Conventional designs require tradeoffs in performance between these two modes.

In more recent attempts, for example, see U.S. Pat. No. 8,827,448, use of astigmatism-free customized lenses are proposed for refractive correction with a first cylindrical power on the anterior surface and a second cylindrical power on the posterior surface of the contact lens. While it is suggested that improved visual acuity is achieved with such a design, these items are limited to the optical zone of the lens and how that interacts with an asymmetrically shaped cornea. Design changes in other regions, most notably the peripheral region of the lens, can still have an impact and would not adversely impact those limited to the optical zone seeking to improve visual acuity and thus coexist and further improve lens performance.

Some innovators in this space have attempted to address the lens/cornea mismatch by customized patient specific designs. Specifically, they measure the corneal surface and attempt to match the posterior surface of the contact lens with the topography of the cornea. See for example U.S. Pat. Nos. 6,786,603, 6,340,229 and 6,305,802. This alternative approach while resulting in a near-perfectly matched conformal fit, may not adequately address the issue at hand as it may introduce undesired consequences related to a lack of movement of the lens due to the precise conformal matching of the lens to the cornea. It also can result in a large number of Stock Keeping Units (SKU's) for a system which is costly to both the manufacturer as well as the consumer. In order to maintain a healthy ocular physiology, movement of the contact lens is essential to allow for adequate tear exchange. Humans on average blink about twelve (12) times each minute while awake, each blink can impart movement to a lens, thus facilitating the essential tear exchange to maintain a healthy tear film. But while movement is important for health purposes, too much movement of the contact lens may negatively impact both subjective comfort and vision.

Soft contact lenses for eye enhancement, be they for customized patient specific devices, presbyopia, astigmatism, cosmetic or therapeutic purposes and/or other optical defects or correction, may be further improved by incorporating non-optical features which leverage the principals of optimized strain energy of the system along a continuum as described herein to achieve optimal positioning, movement, orientation and/or stability of the lens while on eye, all of which can positively impact both comfort and vision and perform these functions in a cost effective manner. The prior art devices described above employ features and designs resulting in certain tradeoffs, for example, comfort and fit for visual acuity, lens centration and movement for health and vision, or lens systems with extensive SKU's to adequately address patient variations. Accordingly, there exists a need for contact lenses with improved on eye performance while maintaining eye health as well as a high degree of comfort and vision.

SUMMARY OF THE INVENTION

The contact lens in accordance with the present invention overcomes the disadvantages associated with the prior art as briefly described above by using design elements/features which tend to counteract/restore the ideal balance of forces, and in particular optimize the resulting strain energy in order to achieve desired centration, movement, orientation, and/or stability for the contact lens. A specific lens design with specific mechanical properties when placed on a specific ocular surface with its specific mechanical properties will interact in such a way to produce a unique state of total strain. If this same lens design with the same mechanical properties is placed on a different ocular surface geometry, the state of strain will be different. Likewise, a different lens design having different mechanical properties when placed on this same ocular surface will also result in a different state of total strain. The point being that both the lens design and mechanical properties of the lens as well as the ocular shape and mechanical properties of the eye tissue matter, not only resulting in a complex interaction of stresses and strains between the two items, but also providing an opportunity to improve how a lens interacts with the ocular surface it is placed on.

Optimization of the strain energy state includes but is not limited to: the location of the minimal amount of strain energy; both the shape or rate of change of the strain energy state; and altering the strain energy states along different directions or dimensions or in selected regions or surfaces. The present invention is also directed to a contact lens design wherein the strain energy state is optimized in a concentric or radial fashion to allow limited but essential movement of the contact lens with respect to the ocular surface while retaining the required centration of the lens to ensure quality vision is maintained. By modifying the strain energy state of the lens/eye system in a bimodally symmetric fashion, presbyopia may be addressed without the need for complicated designs of translating contact lenses. By defining a first optimized strain state along a sagittal plane of the cornea, and defining a second optimized strain state along the multiple transverse planes of the cornea, each strain state being different, optimized movement/translation of the contact lens both in terms of extent and direction can be achieved relative to the cornea without the need for potentially uncomfortable design features. By modifying the strain energy state of the lens/eye system in a circumferential or angular fashion, stabilization needs for the astigmatic patient may be addressed without the need for preferential thick zones that are utilized to achieve stabilization in conventional contact lens and may result in discomfort. By altering the rate of change of the strain energy state, one can alter the rate of change of stabilization and essentially "dial in" the desired time for stabilization across components.

Strain energy optimization and thus desired movement and positioning of the lens relative to the eye it is placed upon, may be achieved by: varying mechanical properties of the contact lens material; varying the thickness of the contact lens; varying the edge design of the contact lens; and selectively varying the posterior curvature in any number of planes or meridians particularly in the peripheral region. The contact lenses of the present invention may be utilized with any type of contact lens optics without additional cost and optimized to improve clinical comfort and/or physiology.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1A:
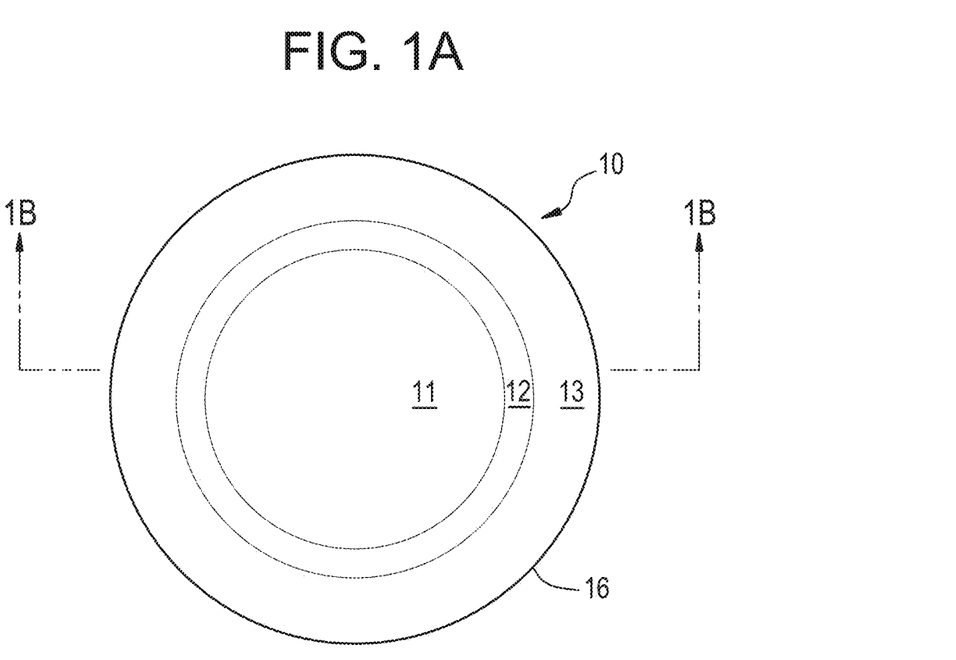
FIGS. 1A and 1B provide a top view and a side view respectively of a contact lens showing the representative regions of interest which may be optimized in accordance with the present invention.

For purposes of the present invention a contact lens 10 as shown in FIG. 1A is defined by at least three distinct regions. The inner region 11 from which the vision correction is obtained, the outer peripheral region 13 of the contact lens 10 that provides mechanical stability of the contact lens 10 on eye, and an intermediate region 12 located between the inner region 11 and the outer region 13 used for blending the two aforementioned regions in a smooth manner such that abrupt discontinuities do not occur. In some exemplary embodiments the intermediate region 12, may not be required.

The inner region 11 or optical zone provides vision correction and is designed for a specific need such as single vision correction, astigmatism vision correction, bi-focal vision correction, multi-focal vision correction, custom correction or any other design that may provide vision correction. The outer periphery or peripheral zone 13 provides for basic fit and stabilization of the contact lens on the eye including, centration and orientation. Orientation stabilization is fundamental when the optical zone includes non-rotationally symmetric features, such as astigmatic correction and/or high order aberrations correction. The optional intermediate region or zone 12 ensures that the optical zone and the peripheral zone are blended smoothly. It is important to note that both the optical zone 11 and the peripheral zone 13 may be designed independently, though sometimes their designs are strongly related when particular requirements are necessary. For example, the design of a toric lens with an astigmatic optical zone might require a particular peripheral zone for maintaining the contact lens at a predetermined orientation on the eye.

Figure 1B:
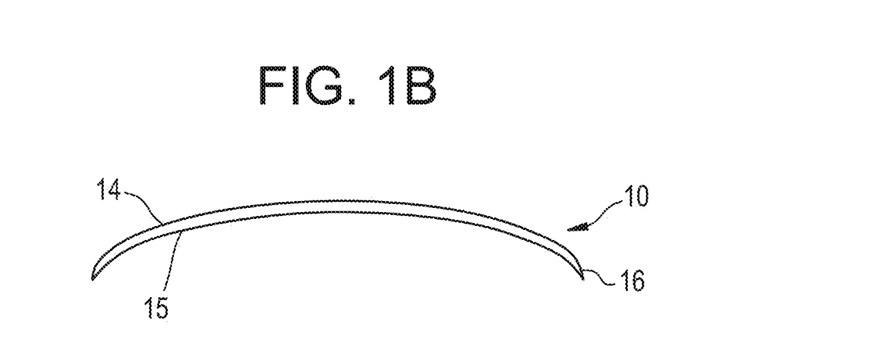

For purposes of the present invention a contact lens is also defined by a front surface 14, a back surface or base curve 15 and an edge 16 as shown in FIG. 1B. The front and back surface of the contact lens is described by at least three regions, the inner region 11 from which the vision correction is obtained, the outer region 13 or periphery of the contact lens that provides mechanical stability of the contact lens on eye, and an optional intermediate region 12 located between the inner region 11 and the outer region 13 used for joining and/or blending the two aforementioned regions in a continuous and/or smooth manner such that discontinuities do not occur. Lens thickness is an important variable which is optimizable and may be determined in any of the three regions, but preferably in the outer or peripheral region 13 by simply measuring the relative vertical distance between the front surface 14 and back surface 15 when the lens is positioned horizontally. The edge 16 is the rim of the contact lens 10 and is another useful variable to consider in an optimization scheme. For the purpose of the present invention, the shape of the edge 16 may be circular or non-circular. The edge 16 is said to be circular if the edge projection onto a given plane is a circle, otherwise the edge is said to be non-circular. Each of these parameters and other geometric variables of the lens may be viewed as inputs and may be varied in an effort to achieve a desired strain energy state.

Figure 2A:
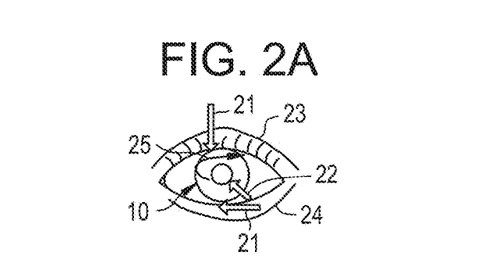
FIG. 2A provides a schematic representation of the lens on eye, and some of the selected forces (external & restoring) which are addressed in accordance with the invention.
Figure 2B:
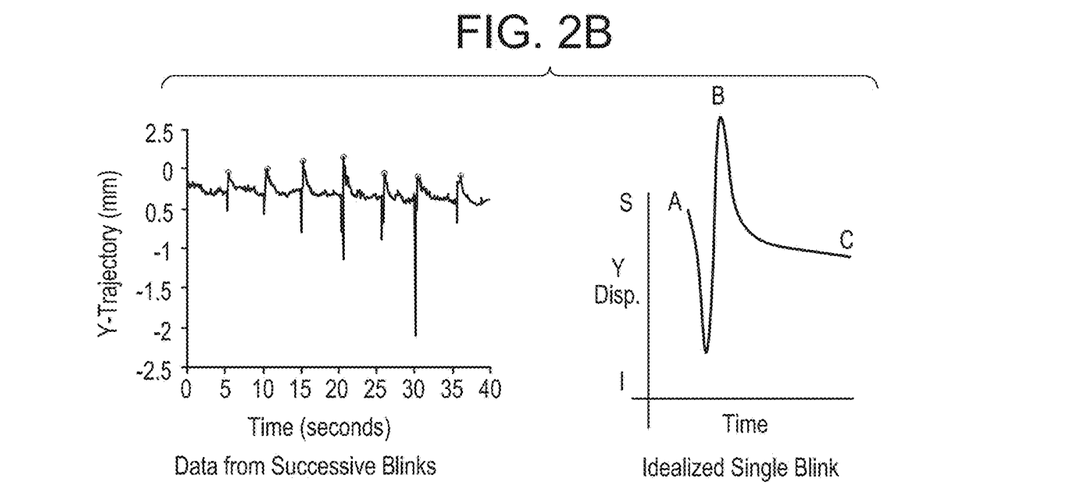
FIGS. 2B and 2C graphically depict the movement of the lens, more specifically the displacement of the lens in the X and Y directions respectively as a result of the external and restoring forces upon the lens during a typical blink cycle.
Figure 2C:
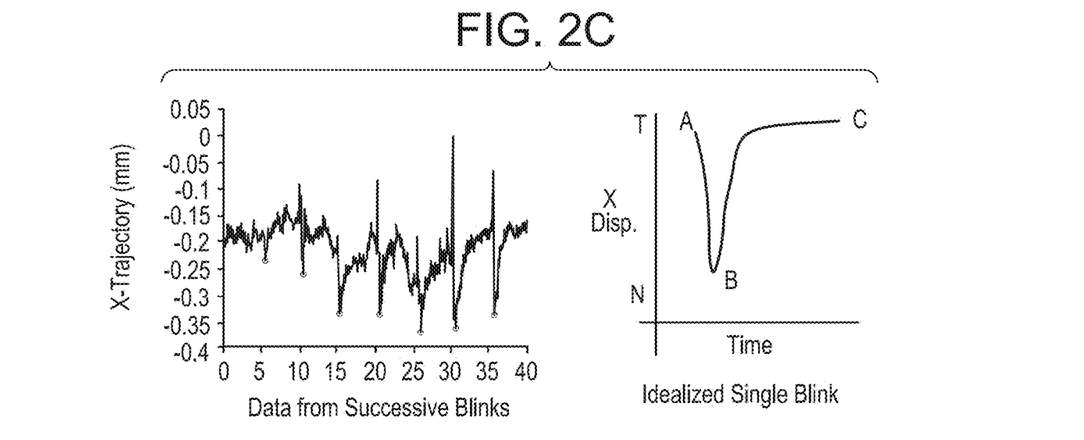

Strain energy is a type of potential energy, and as such may be measured. Strain energy may be stored within a solid when the solid is under load and is deformed as a result of that load. Accordingly, solids in an undeformed state correspond to a state of zero strain. When a lens is placed on eye, the lens may flex to match the shape of the ocular surface. As a result, this deformation in the lens may result in an increase in strain energy stored within the lens. Loads placed on the lens may also result in the lens being displaced relative to the ocular surface. The extent of deformation and/or displacement of the lens when placed on eye will depend on a host of factors such as the magnitude of the forces/loads acting thereon, the ocular surface geometry, the geometry of the lens, the mechanical properties of both the contact lens and the human cornea, including such material properties as elastic modulus, as well as the interactions between the surfaces of these items. As shown in FIG. 2A, it is important to make a distinction between what is termed external forces 21 and what is termed restoring forces 22 because the magnitudes of these forces significantly differ. Major external forces 21 are those imparted to the contact lens 10 when the lens 10 is positioned on the eye by the upper 23 and lower 24 lids and tend to be significantly higher in magnitude than the restoring forces 22. Restoring forces 22 may be affected by items such as friction between the lens and corneal surface, as well as the internal stress state of the lens 10 due to deformations of the lens 10 itself when it interacts with the ocular surface geometry. The external forces typically tend to be larger in magnitude than the restoring forces, and although the force of gravity (not shown) would be considered an additional external force, in a number of cases the magnitude of these gravitational forces would be neglible. Additionally there may be rotational forces or torques 25 present, which rather than impart a translation to the lens 10 would impart a rotational movement. These types of restoring forces are particularly important when it comes to items such as lens stabilization, centration and movement. Thus during a blink, there may be a gross movement of the lens due to the lids imparting an external force 21 upon the lens 10 itself as shown in FIG. 2A. These movements may be measured; such measurements are shown in FIGS. 2B and 2C which graphically depict the vertical (Y) and horizontal (X) displacement respectively of the lens. Both FIGS. 2B & 2C include actual data of lens movement in a given direction (Y or X) for multiple successive blinks as well as an idealized curve showing lens movement for a single blink in the Y or X direction. The lens displacement for a single blink is shown upon the point at which the blink begins (point marked as "A"), through the blink ending (point marked as "B") to the final resting position (point marked as "C"). The lens displacement between points "A" and "B" is a direct result of the application of external forces 21 to the lens. In the case of the Y displacement shown in FIG. 2B, image on the right, this would be primarily from the application of force by the upper eyelid to the lens resulting in superior (S) or inferior (I) movement. In the case of the X displacement, shown in FIG. 2C, this displacement is due to the application of force by both the upper and lower eyelids to the lens resulting in temporal (T) or nasal (N) movement. Subsequent to the blink and application of the external force 21, the restoring forces 22 come into play, it is these restoring forces 22 which act upon the lens resulting in lens displacement between points "B" and "C", ultimately resulting in the lens 10 repositioning to its resting position as shown in both FIGS. 2B and 2C. This process is repeated after each blink for both the vertical (Y) and horizontal (X) displacement of the lens. In the case of the vertical displacement as shown in FIG. 2B, each sequence of a blink, is followed by large movement of the lens 10 itself, first depicted downward and then upward which is due to the application of the external force 21. Immediately after, the restoring forces 22 impart primarily a downward movement, larger at first, but reducing in displacement magnitude over time until the lens 10 is substantially restored to its starting or resting position, up to the very next blink at which point the process is repeated. Similarly see FIG. 2C which shows the impact of the external and restoring forces upon lens movement in the x-direction, together these displacement plots show the interaction of the lens on eye as a result of both the external forces (lids) and restoring forces (lens on eye).

In accordance with the present invention one may treat the optimized strain energy state of the lens on eye as a function of the geometric and mechanical property inputs of both the lens and the eye to be varied until the desired energy strain energy state is achieved. The desired strain energy states may differ depending on the condition one is trying to address such as improved centration, translation, or rotation. Use of this methodology in accordance with the present invention and the resulting contact lenses may also improve lens stabilization, optical correction and comfort. The geometric and mechanical property inputs may include, but are not limited to, lens thickness, lens edge geometry, lens base curve, lens front curve, and lens elastic modulus. This may be expressed functionally in the equation given by $$\{\text{Optimal Strain Energy State}\}_{condition} = \mathcal{F} LG\{LG, EG, LMP, EMP\},$$

where
LG=Lens Geometry,
EG=Eye Geometry,
LMP=Lens Mechanical Properties, and
EMP=Eye Mechanical Properties.

Because of the nature of these materials (hydrogels and biological tissue) this is not a trivial analysis. Furthermore, assessment of the situation and calculation of the formula above is further complicated by environment, temperature as well as time under load due to viscoelastic considerations. Obtaining a true understanding of this energy state is not simple even with well-defined linear elastic materials, no less anisotropic viscoelastic materials with complicated asymmetric geometries. In order to resolve this, the use of Finite Element Analysis ("FEA") provides an analytical methodology to assess and calculate the stresses and strains of objects under a given set of loading, material properties and boundary conditions. Iterative use of FEA may be employed to assess how different geometries with similar mechanical properties will perform under a given loading condition to converge to the optimal solution. With the use of optimization techniques and identification of critical parameters and their relationship to other parameters, a minimization relationship may be developed which may then be iteratively solved using FEA to reveal an ideal optimized geometry that behaves in a desired fashion for a given set of conditions in the function. Ocular surface geometry inputs may be customized, or averaged over representative populations, these inputs in combination with the mechanical properties of the ocular surface may then be modeled along with idealized starting lens geometry. In accordance with the present invention, while any of the lens regions (inner, intermediate, outer peripheral), or lens surfaces (front or back) or the thickness between the two, or lens edge design may be the target of design optimization, a preferred embodiment is that of optimization of the back surface of the outer peripheral region of the lens. Specifically, resulting optimized geometries for the specific purposes of achieving improved centration, translation, rotation and stabilization as well as the method to determine these optimized geometries is the focus of the present invention.

Figure 3:
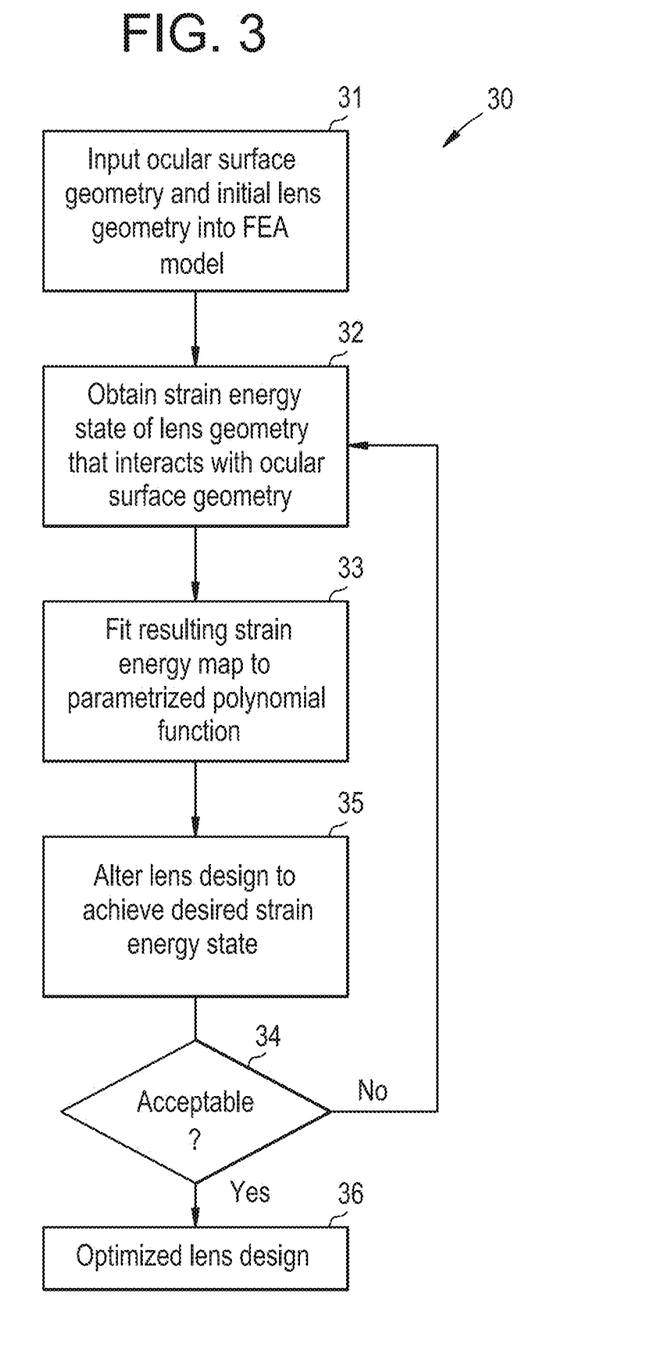
FIG. 3 provides a high-level overview in a flow-chart format of the design methodology employed in accordance with the present invention.

In accordance with the present invention, an overview of the methodology 30, as shown in the flow chart of FIG. 3, is employed to result in an improved strain energy state of the lens. One first inputs ocular surface geometry and an initial lens geometry into the FEA model 31. One then obtains the strain energy state of the lens geometry that interacts with the inputted ocular surface geometry, as a function of position by running the FEA model 32. This is followed by fitting the resulting strain energy map of step two 32 to a high order polynomial function 33. The initial lens design may then be iteratively adjusted, i.e., optimized, so that the fitted strain energy map is equivalent to the desired strain energy state 35. For example, in the situation of optimizing centration, this would result in a lens design whose minimum strain energy state coincides with an ideally centered lens 36. If the strain energy state does not coincide (i.e., not acceptable) in step five 34, then one can iterate again until the desired solution is achived 36. As an example, optional additional secondary adjustments to the lens design in order to optimize the higher order terms may result in further reducing the lens movement relative to the ocular surface, thus obtaining a lens that is not only centered where intended, but with movement limited and centered around a desired centration point. This results in optimal geometry and positioning as well as an ideal extent of movement and comfort. Centration may impact both optical performance and in the case of cosmetic/beauty lenses the aesthetics of how the lens appears when worn. Some movement of the lens is necessary to maintain eye health, whereas excessive movement is not desirous as it can negatively impact vision and comfort. In the above example, an individual ocular surface geometry may be input or alternatively, one may desire to utilize an idealized geometry by averaging over a given population or population subsets depending on what one wishes to achieve. This approach may be repeated for other conditions, such as a lens to achieve optimal translation when on eye for addressing the needs of a presbyope, or a lens to achieve optimal stabilization to meet the needs of an astigmatic patient. To address these situations, one identifies the desired targeted strain energy map and in accordance with the present invention using the methodology indicated varies the design/material inputs until the analysis converges to the targeted strain energy map for that particular condition.

In a preferred aspect of the invention, a method to fabricate a contact lens which utilizes the minimized strain energy difference to optimize the centration of the lens on eye includes the steps of inputting ocular surface geometry and initial contact lens geometry into an analytical model, followed by obtaining an initial strain energy state of the contact lens geometry that interacts with the previously inputted ocular surface geometry, which is then followed by fitting the resulting strain energy state to a parametrized polynomial function, and then altering the contact lens geometry and obtaining a new strain energy state of the contact lens geometry until a balanced (i.e., desired) strain energy map is achieved. In accordance with the present invention, the balanced strain energy map is achieved when differences between the initial and the new strain energy states are minimized using the parametrized polynomial function.

Figure 4:
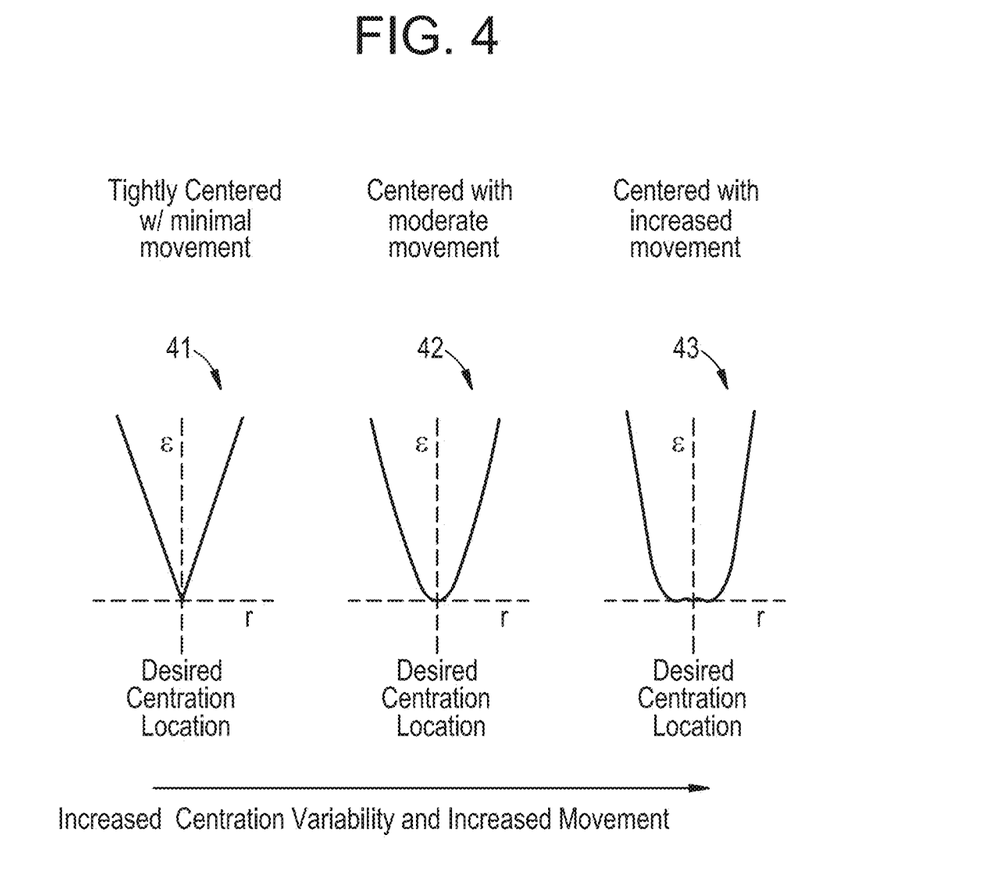
FIG. 4 provides a table and shows an idealized relationship between magnitude of resulting minimum strain energy versus radial position in three exemplary situations and how it may impact lens movement and centration in accordance with the present invention.

FIG. 4 shows a series of three idealized strain energy curves for each entry relative to a radial position of the lens that may be desired. Thus in each case, the vertical axis represents the level of strain energy while the horizontal axis represents the radial position in each example. In the first example, curve 41 represents an idealized state where the lowest strain energy is tightly centered around a single point resulting in minimal movement, and thus at any place other than the zero radial position, the strain energy quickly increases. Ignoring the significantly larger external forces, this condition would equate to a lens that exhibited minimal movement due to the restoring forces, given the energy required to move the lens off its central position would need to overcome the quickly rising and high magnitude strain energy state. In contrast to curve 41, curve 43 results in minimum strain energy that occupies a greater breadth of radial positions, otherwise known as centration variability. As such there will likely be increased movement of the lens in this radial breadth given the value of the strain energy is consistently low (or minimized) in these regions over a wider radial region. As previously stated, non-movement is not desirous due to health concerns. In this particular case, increased movement may be desirous in certain situations, just as excessive movement may not be desirous as it may have a negative impact to vision. Lastly, one could also achieve an intermediate condition as represented by curve 42, in which the lens is centered around the minimal low strain energy state, but the lens/eye interaction allows for moderate movement addressing both health and vision concerns while still maintaining centration. As one progresses from curve 41 to 42 to 43, one sees both increased centration variability as well as increased movement of the lens as indicated by the arrow. Depending on the desired need for centration and/or lens movement one may tailor the geometry and properties in order to achieve the desired effect. In effect, these three curves represent states along a continuum of potential solutions that may be utilized and although only three conditions are represented in the figure, multiple conditions can exist along this continuum.

Figure 5A:
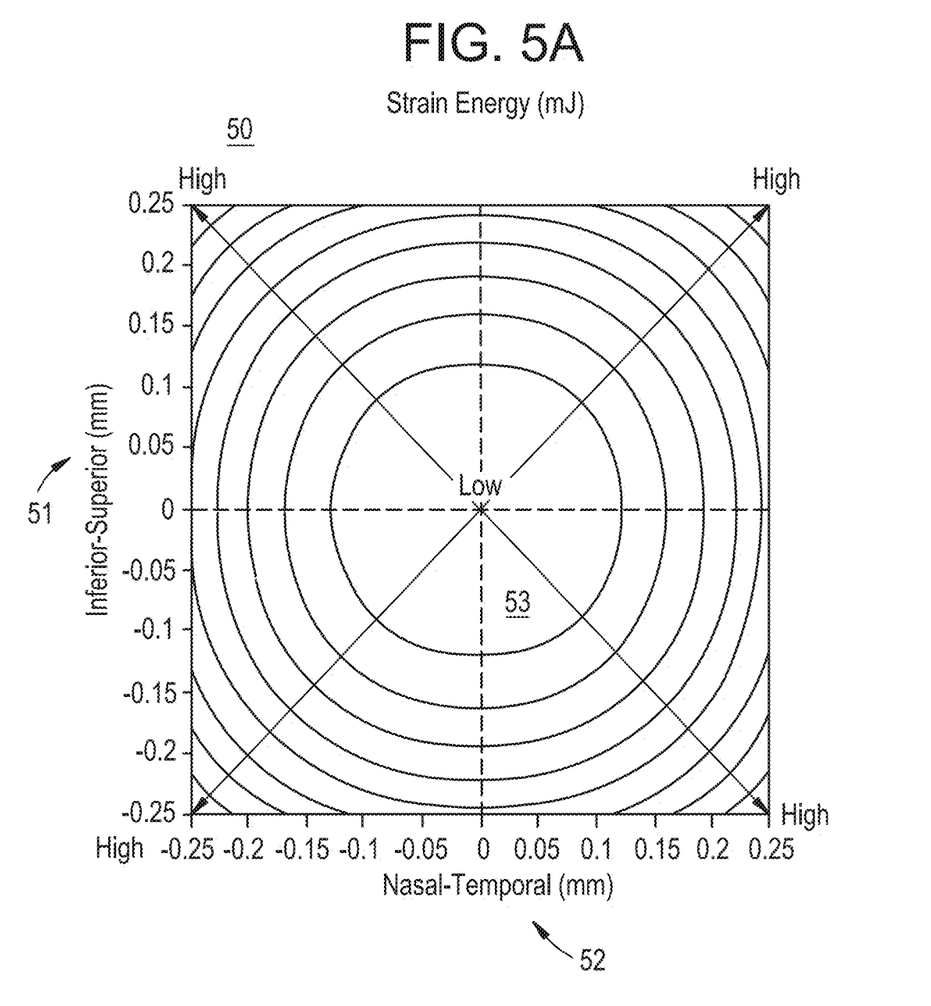
FIG. 5A is a typical resulting strain energy map illustrating magnitude of strain energy by lens position that is the result of the optimization process in accordance with the present invention.
Figure 5B:
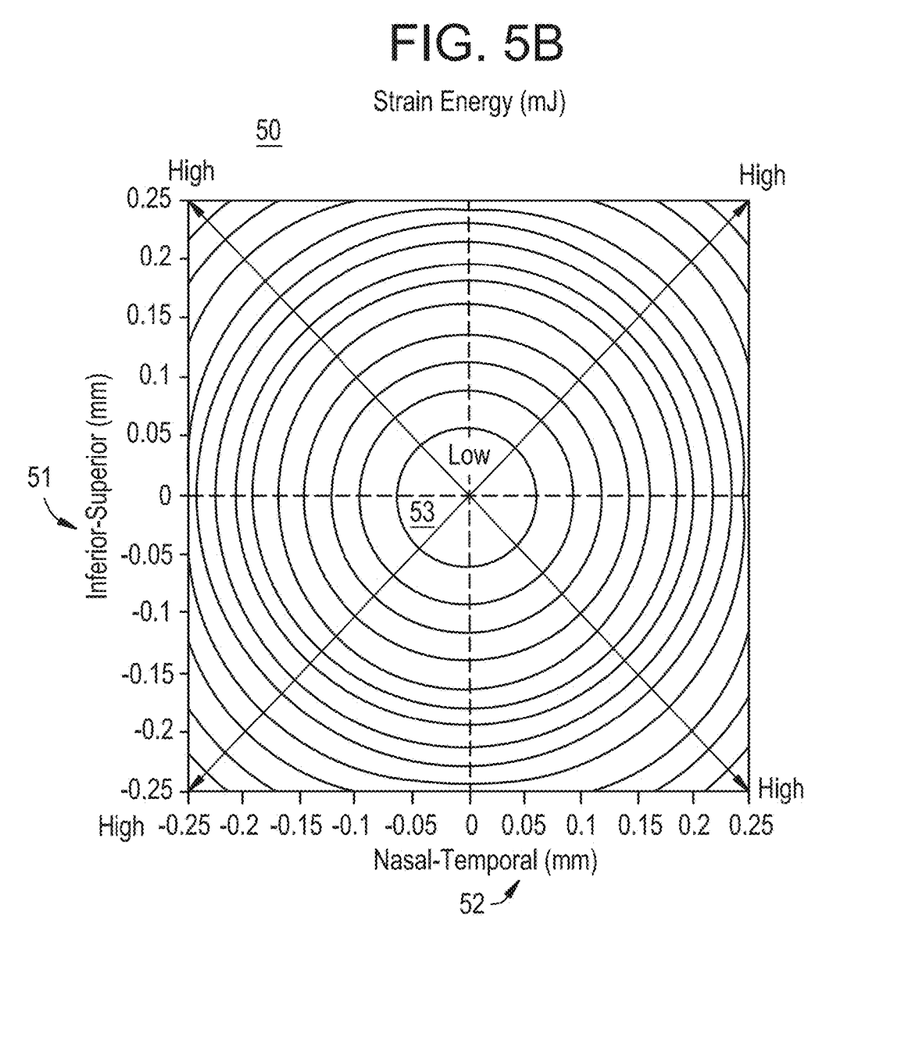
FIG. 5B is a second exemplary resulting strain energy map showing an increased rate of change in strain energy relative to the map shown in FIG. 5A in accordance with the present invention.
Figure 5C:
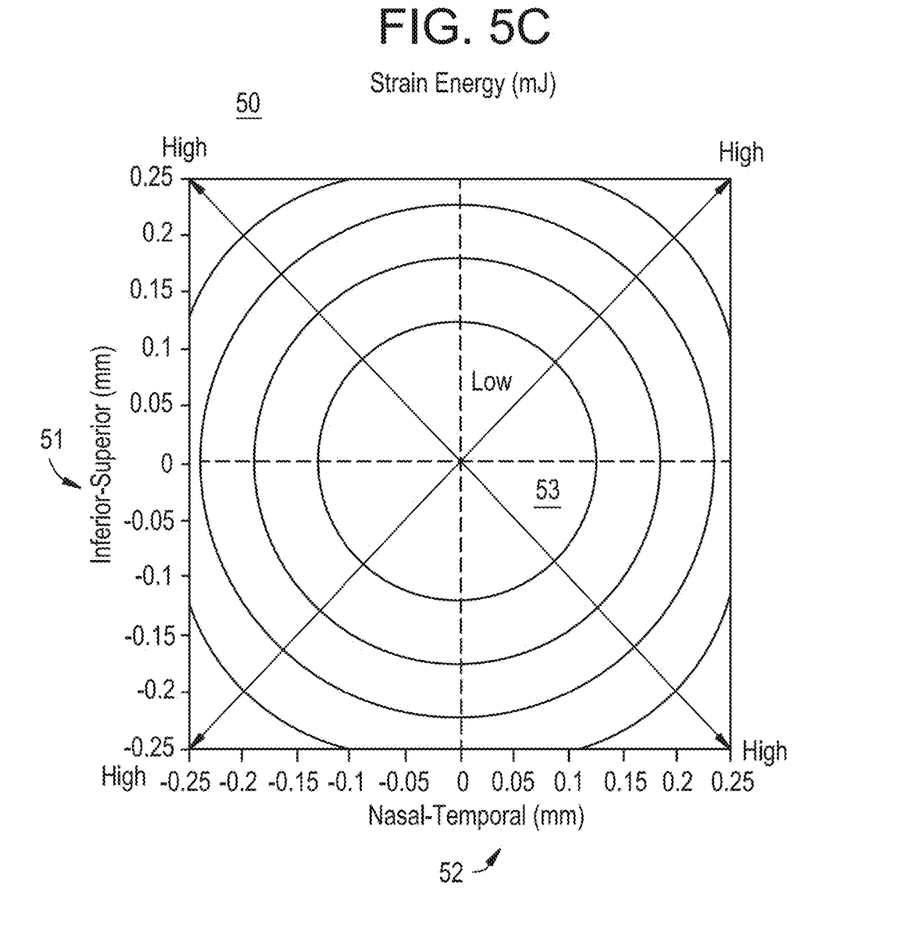
FIG. 5C is a third exemplary resulting strain energy map showing a decreased rate of change in strain energy relative to the map shown in FIG. 5A in accordance with the present invention.

FIGS. 5A-5C shows the resulting strain energy contour map 50 of the previously stated methodology 30 described above with respect to FIG. 3. In this map 50, the vertical axis 51 represents the geometric position along the inferior-superior axis, while the horizontal axis 52 represents the geometric position along the Nasal-Temporal axis. The various contours represent the value of the resulting strain energy at a specific location. The central region 53 located at (0, 0) represents a minimal value of strain energy with values increasing as one moves outward radially to the extreme periphery. In this particular embodiment, the resulting strain energy map is rotationally symmetric, meaning that any outward radial movement in any direction starting from the (0, 0) position will result in a similar increase in strain energy to that of an equivalent radial movement in an alternate direction also starting from the (0,0) position. Thus the strain energy is rotationally balanced, and as such the lens will tend to center about (0,0) in this example. Any movement from the central position will result in an increase in strain energy, and thus the lens will have a natural tendency to return to its minimum strain energy state (i.e., center due to the restoring forces). Because this exemplary embodiment is rotationally symmetric, the extent to which the lens strain energy increases will result in an equivalent restoring force both in terms of magnitude and direction to return the lens to the minimal energy position (i.e., center position). One will appreciate that with changes in design, and optimization parameters, one may change the location of the desired center position relative to the ocular surface geometry. In accordance with an additional exemplary embodiment, one may change the input parameters and resulting lens design to achieve an alternative gradient at which the strain energy is changing. Thus one may still achieve a rotationally symmetric strain energy map, but the strain energy gradient may be increased (see FIG. 5B) as evidenced by more incremental increases over the same radial distance. Or as shown in FIG. 5C, decreased, having less incremental increases as compared to that shown in FIG. 5A. Thus if one desires to increase or decrease the extent of the restoring force by geometry or mechanical property changes of the lens, one may impact how quickly the lens re-centers to the minimum energy position and its resistance to de-center.

Figure 6A:
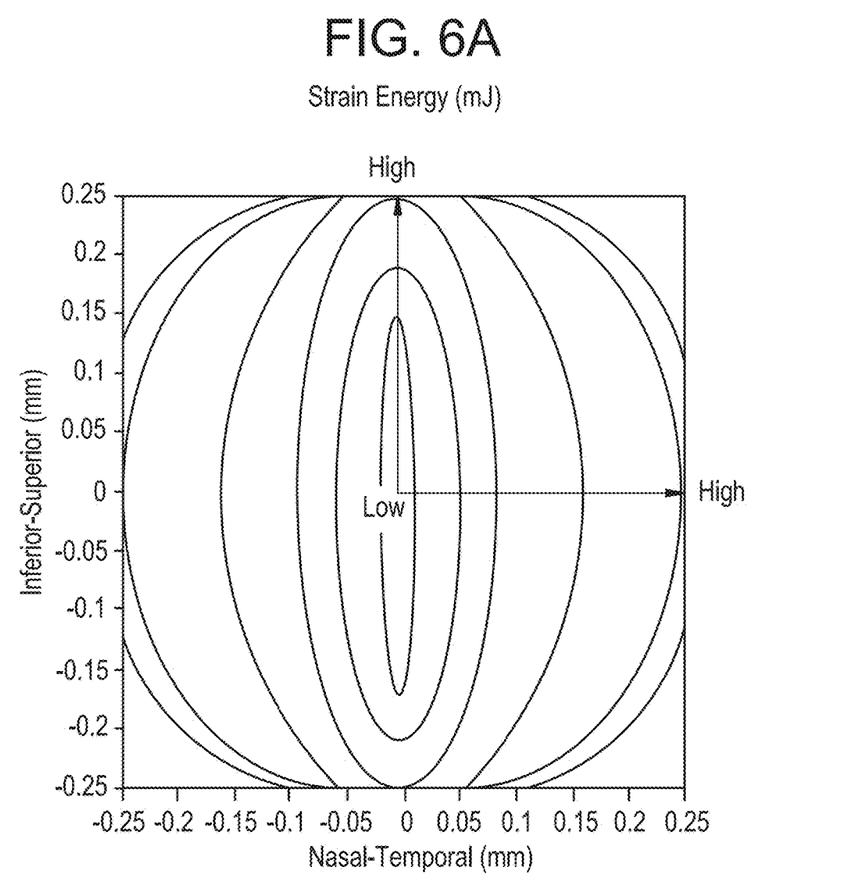
FIG. 6A shows an exemplary bi-latterally symmetric strain energy map by lens position that may be useful to control movement of the lens in a desired fashion in accordance with the present invention.

In yet another alternative exemplary embodiment, one can alter the symmetry of the strain energy map to achieve a desired effect that may be useful for a desired directional movement. By using such an approach one may obtain in accordance with the invention a strain energy map as shown in FIG. 6A. While the strain energy map shown in FIG. 6A is no longer rotationally symmetric, it does possess a bi-lateral symmetry for the strain energy magnitudes in which along a vertical meridian there are equivalent symmetries and magnitudes on both the temporal and nasal sides of the vertical meridian. In this example there are also present, symmetric strain energies both inferior and superior but the rate at which the values of strain energy change for an equivalent movement in the vertical direction (inferior/superior) is significantly less than that of the rate of change in the temporal/nasal directions. As a result, in accordance with the present invention, this lens geometry will have a greater tendency to move vertically or in an inferior-superior direction rather than horizontally (nasal-temporal) since the resistance to movement is greater in the horizontal direction given the increased rate of change of strain energy in this direction. A lens design having a specified geometry which results in a bi-laterally symmetric strain energy map as shown in FIG. 6A may be utilized for preferential inferior-superior translation of the lens. Such a design may be achieved without the use of specific potentially uncomfortable features, since the overall geometry is optimized and configured to achieve the desired result without the specific design feature present. In accordance with the present invention one may create a back surface having a base curve along the outer peripheral region which varies or is different in one or more directions which can result in differing strain energy states having a bilateral symmetry. The direction may be horizontal, vertical or a combination of the two.

Figure 6B:
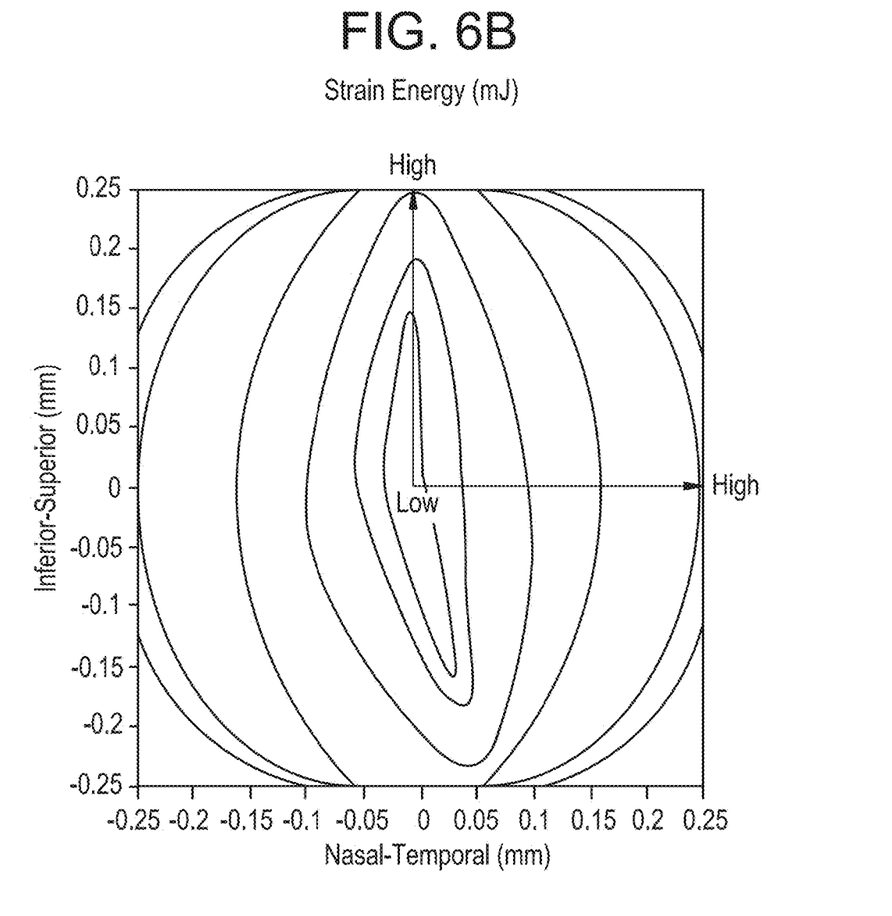
FIG. 6B shows an exemplary higher order bi-latterally symmetric strain energy map with an additional modification that may be useful to further control movement of the lens in a desired fashion in accordance with the present invention.

In accordance with yet another exemplary embodiment, the contact lens may be designed with an additional higher order change that while still maintaining the primarily vertical movement, an inferior/nasal component of movement may be introduced. The resulting strain energy map of this type of lens interaction in accordance with the invention is shown in FIG. 6B. As before the extent and rate of change of the strain energy may be tuned in order to obtain a lens design with the desired intended interaction/movement.

Figure 7A:
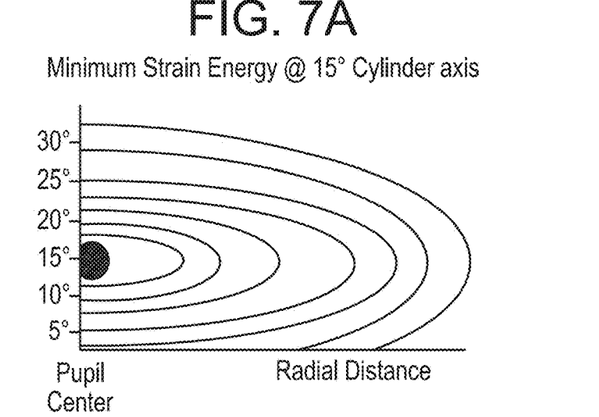
FIGS. 7A through 7C Illustrate how the strain energy may be tailored on an angular/rotational basis that may be useful for achieving effective rotational stabilization in accordance with the present invention.
Figure 7B:
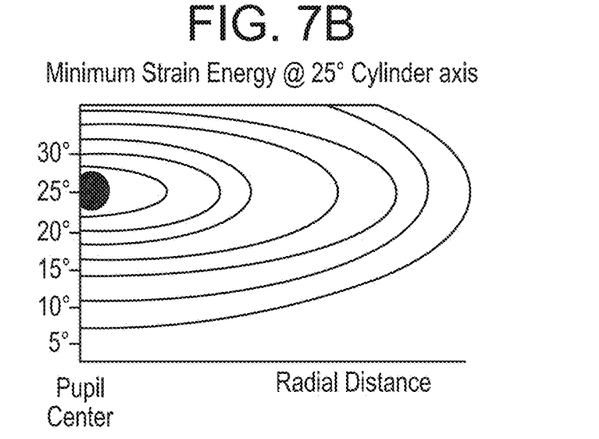
Figure 7C:
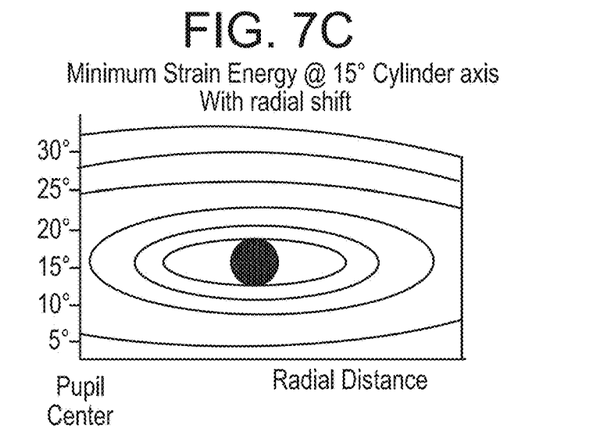

In accordance with yet another exemplary embodiment, the contact lens may be designed to achieve a strain energy map that enables rapid effective and comfortable stabilization. For example, by applying this methodology to the use of toric type lenses for the astigmatic patient one may optimize the strain energy relative to cylinder axis and/or radial location. In this scenario as shown in the series of plots of FIGS. 7A, 7B, and 7C, the graphs indicate the level of strain energy relative to radial position and cylinder axis thus showing the strain energy at each respective cylinder angle and radial position. As one may see in this case, the movement of concern is that of controlling rotation. By having the minimum strain energy position coincide with the desired angular cylinder axis, as shown in FIG. 7A, in this case, a desired targeted cylinder axis of 15°, one may achieve optimal stabilization for this particular cylinder axis angle. Thus the cylinder axis above and below the desired cylinder axis of 15° will have higher levels of strain energy, and additional cylinder axes beyond these have still higher levels of strain energy and thus there will be a tendency for the lens to return to the position of lower strain energy in order for the lens to effectively stabilize at the minimum strain energy level (i.e., to a cylinder axis of 15°). In contrast, FIG. 7B, shows minimum strain energy centered around a cylinder axis of 25°, note how the overall symmetry of the strain energy is shifted vertically upward as compared to the graph in FIG. 7A but the overall shape and desired gradient remains somewhat equivalent. This will result in the lens stabilizing at a cylinder axis of 25° rather than 15° as was shown in FIG. 7A. But one may also "tune" the strain energy in other dimensions. As shown in FIG. 7C, the extent of the gradient in the radial direction (i.e., distance from desired centration center) although less pronounced may still contribute to movement, and in this case, may assist with keeping the lens centered both at a desired axis and at a desired radial position. As in the other exemplary situations, the gradient may be changed here as well to achieve a desired effect as to how quickly the lens returns to its resting position. Contrasting FIG. 7A with that of FIG. 7C, both show a minimum strain energy centered around a cylinder axis of 15°, but the minimum strain energy position and gradient shown on FIG. 7C has been shifted radially from the desired centration center position of that shown in FIG. 7A even though both have a desired minimum strain energy about the cylinder axis of 15°. By tailoring along both dimensions, cylinder axis and desired centration center, one can achieve both rapid and effective stabilization while still maintaining both comfort and vision requirements. In accordance with the present invention one can use this methodology to produce a contact lens that has a back surface whose geometry is configured to interact with the ocular geometry of the eye to produce a symmetric strain energy state relative to the cylinder axis. Such a lens when positioned on eye, upon reacting to the external and restoring forces, would reposition such that both the desired centration and relative rotation of the lens would be achieved as a result of the lens on eye interaction to return to the minimum (i.e., desired) strain energy state.

Figure 8:
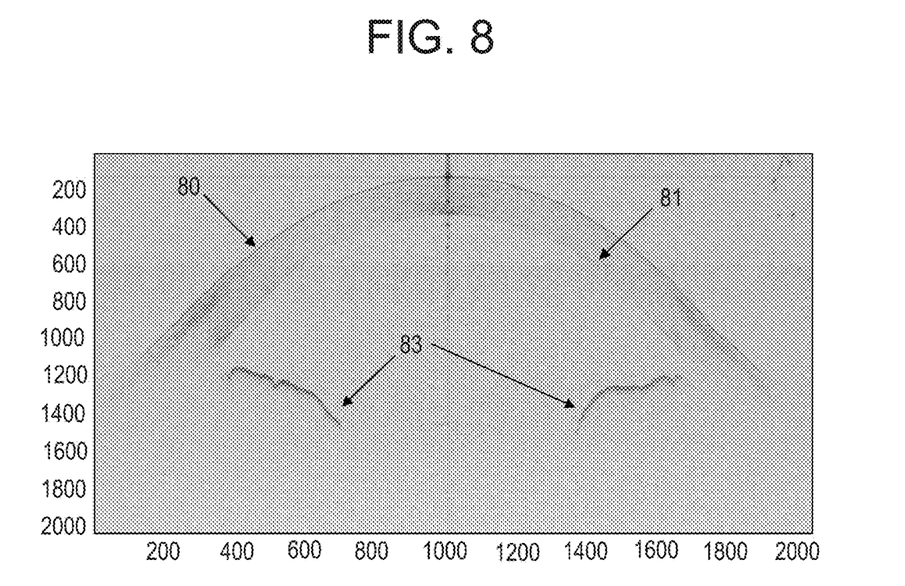
FIG. 8 shows a typical cross-section of the ocular surface geometry with an idealized multi-radius curve overlaid on the cross-section highlighting the radius of curvature differences present.

FIG. 8 shows a cross-section of the ocular surface geometry which has been overlaid with an idealized resulting curve 80 which would be the result of the optimization process described above. As shown in this cross-section one can see the cornea 81 and the iris 83. This curve 80 includes multiple radii which interact with the ocular surface geometry. A change in the radius or radii of either the ocular surface or the contact lens surface will result in a change in this interaction and thus affect the resulting strain energy map.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method that optimizes the centration of a contact lens having an optical zone and a peripheral zone surrounding the optical zone, a front surface and a base curve while on eye, the method comprising the steps of:
   inputting ocular surface geometry obtained from at least one of a patient or an idealized geometry by averaging over a given population of patients and initial contact lens geometry for a given contact lens into an analytical model;
   obtaining an initial strain energy state of the contact lens geometry that interacts with the ocular surface geometry;
   fitting the resulting initial strain energy state to a parametrized polynomial function of contact lens geometry, eye geometry, lens mechanical properties and eye mechanical properties;
   altering the geometry of the base curve of the contact lens in the peripheral zone and obtaining a new strain energy state until a balanced stain energy state is achieved by minimizing the difference between the initial and the new strain energy states using an iterative function to solve the parameterized polynomial function; and
   fabricating a contact lens which utilizes the minimized strain energy difference.

2. The method of claim 1 wherein the balanced strain energy map has a location of minimum strain energy that is both horizontally and vertically centered at the selected resting position for a given lens geometry and ocular surface geometry.

3. The method of claim 1 further comprising optimizing a movement of the contact lens on eye by controlling the slope or rate of change of the balanced strain energy map relative to the contact lens position on eye.

4. The method of claim 1 further comprising optimizing a movement of the contact lens on eye by controlling the asymmetry of the balanced strain energy relative to the contact lens position on eye.

5. The method of claim 3 in which the movement of the lens is rotational.

6. The method of claim 4 in which the movement of the lens is rotational.

* * * * *